United States Patent [19]

Minchak

[11] 4,110,528

[45] * Aug. 29, 1978

[54] RING-OPENED COPOLYMERS OF AT LEAST ONE NORBORNENE-TYPE MONOMER WITH DICYCLOPENTADIENE

[75] Inventor: Robert John Minchak, Parma Heights, Ohio

[73] Assignee: The B. F. Goodrich Company, Akron, Ohio

[*] Notice: The portion of the term of this patent subsequent to Jan. 11, 1994, has been disclaimed.

[21] Appl. No.: 782,103

[22] Filed: Mar. 28, 1977

Related U.S. Application Data

[63] Continuation-in-part of Ser. No. 568,898, Apr. 17, 1975, Pat. No. 4,069,376.

[51] Int. Cl.² .................... C08F 32/08; C08F 232/08; C08F 36/00
[52] U.S. Cl. .................................. 526/283; 526/137; 526/153; 526/280; 526/281; 526/282; 526/916
[58] Field of Search ............... 526/282, 137, 153, 280, 526/283, 281, 916

[56] References Cited

U.S. PATENT DOCUMENTS

| 3,467,633 | 9/1969 | Harris et al. | 526/280 |
|---|---|---|---|
| 3,577,400 | 5/1971 | Judy | 526/154 |
| 3,597,403 | 8/1971 | Ofstead | 526/137 |
| 3,684,781 | 8/1972 | Nutzel et al. | 526/169 |
| 3,687,921 | 8/1972 | Oberkirch et al. | 526/169 |
| 3,778,420 | 12/1973 | Brown et al. | 526/283 |
| 3,790,545 | 2/1974 | Minchak | 526/159 |
| 3,816,382 | 6/1974 | Streck et al. | 526/90 |
| 3,836,593 | 9/1974 | Streck et al. | 526/136 |

FOREIGN PATENT DOCUMENTS 1,068,620  5/1967  United Kingdom .................... 526/283

*Primary Examiner*—Herbert J. Lilling
*Attorney, Agent, or Firm*—Charles A. Crehore

[57] ABSTRACT

At least one norbornene-type monomer is copolymerized with about 0% to about 95% by weight of dicyclopentadiene, based upon total polymer weight. The polymerization is primarily by ring opening and is conducted in the presence of (1) a catalyst comprising (a) at least one compound selected from the group consisting of dialkylaluminum iodides, alkylaluminum diiodides and mixtures of trialkylaluminum compounds with iodine, (b) at least one dialkylaluminum chloride or alkylaluminum dichloride and (c) at least one monomer- or solvent-soluble tungsten compound, and (2) at least one nonconjugated acyclic olefin having at least one hydrogen on each double-bonded carbon atom. Catalyst components (a) and (b) are charged before catalyst component (c). Use of a catalyst containing components (a), (b) and (c) produces easy-processing and substantially gel-free polymers, whereas a catalyst containing only (a) and (c) or only (b) and (c) produces heavily gelled polymers.

9 Claims, No Drawings

RING-OPENED COPOLYMERS OF AT LEAST ONE NORBORNENE-TYPE MONOMER WITH DICYCLOPENTADIENE

CROSS REFERENCE TO RELATED APPLICATION

This is a continuation-in-part of my co-pending application Ser. No. 568,898 filed Apr. 17, 1975, now U.S. Pat. No. 4,069,376.

BACKGROUND OF THE INVENTION

U.S. Pat. No. 3,597,403 teaches polymerization of certain unsaturated alicyclic compounds with a catalyst comprising (A) at least one compound selected from the group consisting of alkylaluminum dihalides, alkylaluminum sesquihalides and aluminum halides, (B) at least one compound selected from the group consisting of molecular oxygen, chlorine, bromine, iodine and cyanogenhalides, and (C) at least one transition metal compound selected from the group consisting of tungsten and molybdenum carbonyl complex compounds. It is also known that certain hydrocarbon monoolefins may be used to adjust molecular weight of polyalkenamers (U.S. Pat. No. 3,816,382). The very broad teachings of the prior art fail to suggest a polymerization process for production of easy-processing and substantially gel-free norbornenedicyclopentadiene ring-opened copolymers. Such a process and copolymers are desired in order to simplify polymer removal from polymerization vessels.

SUMMARY OF THE INVENTION

At least one norbornene-type monomer is copolymerized with about 0% to about 95% by weight of dicyclopentadiene, based upon total polymer weight. The polymerization is primarily by ring opening and is conducted in the presence of (1) a catalyst comprising (a) at least one compound selected from the group consisting of dialkylaluminum iodides, alkylaluminum diiodides, and mixtures of trialkylaluminum compounds with elemental iodine, (b) at least one dialkylaluminum chloride or alkylaluminum dichloride and (c) at least one monomer- or solvent-soluble tungsten compound, and (2) at least one nonconjugated acyclic olefin having at least one hydrogen on each double-bonded carbon atom. Catalyst components (a) and (b) are charged before catalyst component (c).

DETAILED DESCRIPTION

At least one norbornene-type monomer is copolymerized with about 0% to about 95% by weight, more preferably from about 40% to about 95% by weight, and even more preferably from about 60% to about 95% by weight of dicyclopentadiene, based upon total polymer weight. The norbornene-type monomer has the formula

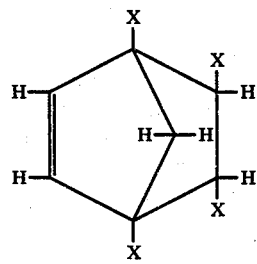

wherein any X may be hydrogen or an alkyl group containing from 1 to 20 carbon atoms, more preferably from 1 to 3 carbon atoms. Examples of suitable norbornene-type monomers include 2-norbornene, 5-methyl-2-norbornene, 5,6-dimethyl-2-norbornene, 5-ethyl-2-norbornene, and the like. Excellent results were obtained with 2-norbornene, 5-methyl-2-norbornene, 5,6-dimethyl-2-norbornene and 5-ethyl-2-norbornene. The copolymers may also contain polymerized therein up to about 10% by weight of at least one other cycloolefin, based upon total polymer weight. Examples of suitable termonomeric cycloolefins include monocyclic monoolefins and diolefins containing from 4 to 12 carbon atoms, more preferably from 4 to 8 carbon atoms, such as cyclobutene, cyclopentadiene, cycloheptene, cyclooctene, 1,5-cyclooctadiene, cyclodecene and the like. Also suitable are bicyclic olefins containing from 7 to 16 carbon atoms and from 1 to 4 double bonds, more preferably from 8 to 12 carbon atoms and 2 or 3 double bonds, such as norbornadiene and the like. As would be obvious, cycloolefins which cannot be polymerized with ring-opening, e.g., cyclohexene and the derivatives thereof, are not employed as termonomers in the polymerization process of this invention.

At least one norbornene-type monomer is copolymerized with dicyclopentadiene to form a linear, unsaturated polymer having repeating linkages primarily of the following types in random order, where "m" and "n" are numbers which are proportional to the concentrations of norbornene-type monomer and dicyclopentadiene used, and "X" is as defined heretofore:

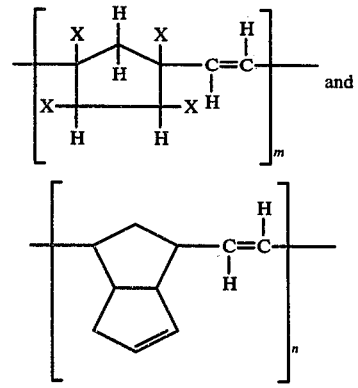

The polymerization is conducted in the presence of (1) a catalyst comprising (a) at least one compound selected from the group consisting of dialkylaluminum iodides, alkylaluminum diiodides and mixtures of trialkylaluminum compounds with iodine, (b) at least one dialkylaluminum chloride or alkylaluminum dichloride and (c) at least one monomer- or solvent-soluble tungsten compound, and (2) at least one non-conjugated acyclic olefin having at least one hydrogen on each double-bonded carbon atom. Catalyst components (a) and (b) are charged before catalyst component (c).

Catalyst component (a) comprises at least one dialkylaluminum iodide or alkylaluminum diiodide wherein each alkyl group contains from 2 to 8 carbon atoms, more preferably from 2 to 4 carbon atoms, such as diethylaluminum iodide, ethylaluminum diiodide, propylaluminum diiodide, ethylpropylaluminum iodide and the like. A mixture of a trialkylaluminum compound and iodine may also be used wherein each alkyl group contains from 2 to 8 carbon atoms, more preferably from 2 to 4 carbon atoms, such as a mixture of triethylaluminum and iodine and the like. Excellent results were obtained with diethylaluminum iodide.

Catalyst component (b) comprises at least one dialkylaluminum chloride or alkylaluminum dichloride wherein each alkyl group contains from 2 to 8 carbon atoms, more preferably from 2 to 4 carbon atoms, such as diethylaluminum chloride, ethylaluminum dichloride, propylaluminum dichloride and the like. Catalyst component (a) is used in a molar ratio to catalyst component (b) from about 0.1/1 to about 10/1, more preferably from about 0.5/1 to about 2/1. Ethylaluminum dichloride gave excellent results.

Catalyst component (c) comprises at least one monomer or solvent-soluble tungsten compound. Suitable tungsten compounds include tungsten carbonyl [$W(CO)_6$], tungsten oxytetrachloride, and the like. Also suitable and more preferred are tungsten halides, which include chlorides, bromides, iodides and fluorides such as tungsten hexachloride, tungsten hexafluoride and the like. Excellent results were obtained using tungsten hexachloride.

The combined amount of catalyst components (a) and (b) is from about 0.1 to about 10 millimoles per mole of monomer. The combined amount of catalyst components (a) and (b) is used in a catalytically effective molar ratio to tungsten compound from about 1 to about 80 moles per mole, more preferably from about 1 to about 50 moles per mole. The elemental iodine is used in the range of from about 0.25 mole to about 6 moles of elemental iodine per mole of trialkylaluminum compound, more preferably from about 0.5 to about 3 moles per mole. The catalyst components may be charged directly or in solution, but catalyst components (a) and (b) must be charged before the tungsten compound.

Surprisingly, the catalyst must contain at least one compound each of catalyst components (a), (b), and (c) in order to produce substantially gel-free norbornene-dicyclopentadiene copolymers. For example, a mixture of diethylaluminum iodide, ethylaluminum dichloride and tungsten hexachloride was found to produce excellent results. In contrast, a catalyst containing only diethylaluminum iodide and tungsten hexachloride produced a heavily gelled polymer. Similarly, a catalyst containing only ethylaluminum dichloride and tungsten hexachloride produced a heavily gelled polymer. The utility of the three-part catalyst in the process of this invention was totally unexpected.

At least one nonconjugated acyclic olefin is used having at least one hydrogen on each double-bonded carbon atom and containing 2 to 12 carbon atoms, more preferably 2 to 8 carbon atoms. Inert substituents on the remaining carbon atoms are selected from the group consisting of hydrogens and alkyl groups containing 1 to 8 carbon atoms. Examples of suitable compounds include 1-olefins such as 1-butene, 3-methyl-1-butene, and the like; 2-olefins such as 2-pentene, 4-methyl-2-pentene and the like; 3-olefins such as 5-ethyl-3-octene and the like; nonconjugated diolefins such as 1,6-hexadiene and the like; nonconjugated triolefins such as 1,4,7-octatriene and the like; and like compounds. More preferably the nonconjugated acyclic olefin is selected from the group consisting of 1-olefins and 2-olefins containing 2 to 8 carbon atoms such as 1-butene, 3-methyl-1-butene, 2-pentene, 4-methyl-2-pentene and the like. Compounds not having hydrogen atoms substituted on double-bonded carbons are unreactive in this invention, and conjugated olefins such as butadiene, isoprene and the like are active inhibitors.

The nonconjugated acyclic olefin is used in a molar ratio to total norbornene and dicyclopentadiene from about 0.0001 to about 0.3 mole per mole. The nonconjugated acyclic olefin may be charged directly or in solution at any point in the charge procedure, but it is more preferably charged along with the monomers. When charged last, the nonconjugated acyclic olefin preferably is charged before reaction begins.

Use of a polymerization solvent in the process of this invention is preferred but not required. Suitable solvents include aliphatic or cycloaliphatic hydrocarbon solvents containing 4 to 10 carbon atoms such as pentane, hexane, heptane, octane, cyclohexane, cyclooctane and the like; aromatic hydrocarbon solvents containing 6 to 14 carbon atoms and which are liquid or easily liquified such as benzene, toluene, naphthalene and the like; and substituted hydrocarbons wherein the substituents are inert, such as dichloromethane, chloroform, chlorobenzene and the like. Benzene was found to be an excellent solvent. The solvent may be added at any point in the charging procedure, but a portion preferably is used to dissolve the catalyst and the remainder added before the catalyst solution.

A polymerization activator may be used but is not generally needed. Examples of activators include water, methanol, ethanol, isopropyl alcohol, benzyl alcohol, phenol, ethyl mercaptan, 2-chloroethanol, 1,3-dichloropropanol, p-bromophenol, epichlorohydrin, ethylene oxide, cyclopentene-2-hydroperoxide, cumyl hydroperoxide, tertiary butyl peroxide, benzoyl peroxide, and air or oxygen. Excellent activation is obtained by using air or a peroxide or hydroperoxide as the activator, especially by using the organic peroxides such as benzoyl peroxide. The activator may be employed in a range from about 0 moles to about 3 moles per mole of organoaluminum compound, more preferably from about 0 to about 1 mole per mole. The activator may be added at any point in the charge procedure, but it is more preferably added last, after the tungsten compound.

The monomers may be added at any point in the charging procedure. Normally, the monomers, solvent and nonconjugated acyclic olefin are added first to the reactor vessel. The ingredients may be added separately or as a mixture of ingredients. Catalyst component (a) (alkylaluminum iodide compound or mixture of trialkylaluminum compound and elemental iodine) and catalyst component (b) (alkylaluminum chloride compound) are added next as a mixture or separately in either order, but usually in solution in a solvent described heretofore. More preferably catalyst component (a) is added first in order to carry out the titration procedure described below, followed by catalyst component (b). The tungsten compound is added next as a solution in a solvent described heretofore, followed by the activator if used. The tungsten compound must be added after catalyst components (a) and (b).

Monomeric impurities such as water and the like should be removed prior to addition of the tungsten compound. The alkylaluminum iodide compound or mixture of trialkylaluminum compound and elemental iodine may be used to titrate the monomers or mixture of monomers and solvent until a color change from pink to colorless or slightly yellow is noted. A catalytically effective amount of alkylaluminum iodide compound or a mixture of trialkylaluminum compound and elemental iodine may then be added, followed by addition of catalyst component (b) and finally the tungsten compound. The end point of the titration is typically difficult to pinpoint exactly. With minor impurities present, up to ten times the catalytically effective amount and more of the alkylaluminum iodide or mixture of trialkylaluminum compound and iodine may be required to render the impurities harmless.

Both the mixing of catalyst components and the reaction are preferably carried out in an inert atmosphere such as nitrogen and in the substantial absence of air or water. The reaction is conducted under sufficient pressure to keep the monomers in liquid state, the pressure required depending upon the reaction temperature. The particular solvent system selected must be liquid under the reaction conditions used. Reaction temperature may be from about $-50°$ C. to about $100°$ C, more preferably from about $0°$ C. to about $35°$ C. The polymerization may be short-stopped by addition of alcohols, amines or carboxylic acids such as ethanol, t-butyl phenol, diethylamine, acetic acid and the like.

The polymer may be isolated by any method known to the art such as by direct drying under reduced pressure, by precipitation using an alcohol such as methanol, ethanol, isopropanol and the like, or by steam or hot water stripping. The polymer is recovered and may be washed further with water or an alcohol and then dried.

The copolymers of this invention are high molecular weight products having an inherent viscosity from about 0.1 to about 10, more generally from about 0.5 to about 5 and are greater than 90% soluble in a solvent defined heretofore. Substantial insolubility indicates the presence of gel. By inherent viscosity ($\eta_{inh}$) is meant a value obtained by dividing the natural logarithm of relative viscosity ($\eta_r$ = ratio of solution viscosity to solvent viscosity) by the concentration (c) being measured in grams of polymer per 100 milliliters of solvent at a given temperature, in this case 0.1 gram in 100 milliliters of toluene at $25°$ C:

$$\eta_{inh} = \frac{\ln \eta_r}{c} = \frac{\ln\left(\frac{\eta}{\eta_0}\right)}{c}$$

The inherent viscosity is regarded as a measure of molecular weight and is reported in units of deciliters/gram.

The following examples illustrate the present invention more fully.

EXAMPLES 1-10

2-Norbornene was copolymerized with dicyclopentadiene by the following procedure. Glass or glass-lined reactor vessels were used. Each vessel was well-cleaned with soap and water, rinsed with acetone, heated in an oven at $140°$ C. and thereafter flushed with nitrogen. 2-Norbornene and dicyclopentadiene were mixed with benzene and charged to the reactor vessel. 1-Butene was added as a 2 volume percent solution in benzene. The diethylaluminum iodide (0.5 molar solution in benzene) was charged next, followed by ethylaluminum dichloride (0.25 molar solution in benzene). Tungsten hexachloride (0.05 molar solution in benzene) was added last. The polymerizations were performed at about $22°$ C. and produced little heat. Little agitation was required for efficient polymerization. The reactions were short-stopped by the addition of ethanol, and the polymers were precipitated and washed using ethanol. About 1 wt.% of di-t-butyl paracresol was added to the polymer as an antioxidant, and the polymer was dried in a vacuum oven at about $50°$ C. Percent yield was based upon the total weight of norbornene, dicyclopentadiene and 1-butene charged. The grams and moles of reactants, yields, percentages of dicyclopentadiene in polymers, inherent viscosities (IV) and % insolubilities of the polymers are set forth in Table I.

TABLE I

| EXAMPLES | 1 | 2 | 3 | 4 | 5 |
|---|---|---|---|---|---|
| Benzene, grams | 71.3 | 72.7 | 74.3 | 75.9 | 84.5 |
| moles | 0.91 | 0.93 | 0.95 | 0.97 | 1.08 |
| 2-Norbornene, grams | 0.82 | 0.82 | 0.8 | 0.82 | 0.88 |
| millimoles | 8.7 | 8.7 | 8.4 | 8.7 | 9.3 |
| DCPD, grams | 8.75 | 8.7 | 8.6 | 9.3 | 9.3 |
| millimoles | 66 | 66 | 65 | 70 | 70 |
| 1-Butene, grams | 0.19 | 0.19 | 0.19 | 0.19 | 0.02 |
| millimoles | 3.3 | 3.3 | 3.3 | 3.3 | 0.4 |
| $Et_2AlI$, grams | 0.016 | 0.016 | 0.016 | 0.016 | 0.010 |
| millimoles | 0.075 | 0.075 | 0.075 | 0.075 | 0.05 |
| $EtAlCl_2$, grams | 0.010 | 0.010 | 0.019 | 0.038 | 0.012 |
| millimoles | 0.075 | 0.075 | 0.15 | 0.3 | 0.1 |
| $WCl_6$, grams | 0.006 | 0.006 | 0.008 | 0.008 | 0.001 |
| millimoles | 0.015 | 0.015 | 0.02 | 0.02 | 0.0025 |
| $Et_2AlI/EtAlCl_2$ molar ratio | 1.0 | 1.0 | 0.5 | 0.25 | 0.5 |
| Millimoles Al compound/mole monomer | 1.9 | 1.9 | 2.9 | 4.5 | 1.9 |
| Al/W molar ratio | 10.0 | 10.0 | 11.2 | 18.7 | 44 |
| Time, Hours | 1.0 | 17.0 | 17.0 | 17.0 | 16.0 |
| Polymer yield, grams | 9.2 | 8.3 | 9.1 | 8.5 | 6.6 |
| Wt. % | 94 | 85 | 94 | 82 | 6.4 |
| Wt. % DCPD in polymer | 90 | 90 | 90 | 90 | 91 |
| IV | 0.48 | 0.47 | 0.53 | 0.47 | 2.3 |
| Appearance | Smooth | Smooth | Smooth | Smooth | Smooth |
| EXAMPLES | 6 | 7 | 8 | 9 | 10 |
| Benzene, grams | 82.1 | 74.0 | 75.5 | 73.8 | 72.0 |
| moles | 1.05 | 0.95 | 0.97 | 0.94 | 0.92 |
| 2-Norbornene, grams | 0.85 | 0.8 | 0.82 | 0.85 | 0.85 |
| millimoles | 9.0 | 8.5 | 8.7 | 9.0 | 9.0 |
| DCPD, grams | 8.65 | 8.62 | 8.6 | 8.7 | 8.7 |
| millimoles | 65 | 65 | 65 | 66 | 66 |
| 1-Butene, grams | 0.05 | 0.10 | 0.02 | 0.05 | 0.10 |
| millimoles | 0.9 | 1.8 | 0.4 | 0.9 | 1.8 |
| $Et_2AlI$, grams | 0.021 | 0.016 | 0 | 0 | 0 |
| millimoles | 0.1 | 0.075 | 0 | 0 | 0 |
| $EtAlCl_2$, grams | 0 | 0 | 0.016 | 0.016 | 0.016 |
| millimoles | 0 | 0 | 0.125 | 0.125 | 0.125 |

TABLE I-continued

| | | | | | |
|---|---|---|---|---|---|
| $WCl_6$, grams | 0.003 | 0.003 | 0.001 | 0.001 | 0.001 |
| millimoles | 0.0075 | 0.0075 | 0.0025 | 0.0025 | 0.0025 |
| $Et_2AlI/EtAlCl_2$ molar ratio | — | — | — | — | — |
| Millimoles Al compound/mole monomer | 1.3 | 1.0 | 1.7 | 1.6 | 1.6 |
| Al/W molar ratio | 13.3 | 10 | 50 | 50 | 50 |
| Time, Hours | 16 | 16 | 16 | 16 | 16 |
| Polymer yield, grams | 1.2 | 5.6 | 10.6 | 1.6 | 5.1 |
| Wt. % | 13 | 59 | 100 | 17 | 53 |
| Wt. % DCPD in polymer | 90 | 90 | 91 | 91 | 90 |
| IV | 1.50 | 0.26 | 2.31 | 0.78 | 0.51 |
| Appearance | Gelled | Gelled | Gelled | Gelled | Gelled |

Symbols in Table I:
DCPD = Dicyclopentadiene
$Et_2AlI$ = Diethylaluminum iodide
$EtAlCl_2$ = Ethylaluminum dichloride
$WCl_6$ = Tungsten hexachloride $$\text{Millimoles Al compound/mole monomer} = \frac{\text{millimoles of }(Et_2AlI + EtAlCl_2)}{\text{moles of (2-Norbornene + DCPD + 1-Butene)}}$$

$$\text{Al/W molar ratio} = \frac{\text{millimoles of }(Et_2AlI + EtAlCl_2)}{\text{millimoles of }WCl_6}$$

Examples 1 through 5 illustrate production of a clear, smooth, gel-free norbornene-dicyclopentadiene copolymer cement in good yield with proper reactants and conditions as described heretofore; 1-butene, diethylaluminum iodide, ethylaluminum dichloride, and tungsten hexachloride were used with suitable Al/monomer and Al/W ratios, and the aluminum compounds were charged before the tungsten hexachloride. In contrast, examples 6 and 7 illustrate production of gelled, grainy polymer using a catalyst without the necessary second component, ethylaluminum dichloride. Examples 8, 9 and 10 illustrate production of gelled, grainy polymer using a catalyst without the necessary first component, diethylaluminum iodide.

EXAMPLES 11-25

5-Methyl-2-norbornene was copolymerized with dicyclopentadiene using the same procedure described for examples 1-5. The grams and moles of reactants, yields, percentages of DCPD in polymers, inherent viscosities (IV) and % insolubilities of the polymers are set forth in Table II.

TABLE II

| EXAMPLES | 11 | 12 | 13 | 14 | 15 |
|---|---|---|---|---|---|
| Benzene, grams | 69.2 | 69.6 | 75.1 | 70.4 | 417 |
| moles | 0.89 | 0.89 | 0.96 | 0.90 | 5.34 |
| 5-Methyl-2-norbornene, grams | 7.7 | 6.0 | 7.6 | 6.0 | 25.3 |
| millimoles | 71 | 55 | 70 | 55 | 234 |
| DCPD, grams | 1.1 | 2.8 | 1.1 | 2.9 | 29.0 |
| millimoles | 8 | 21 | 8 | 22 | 219 |
| 1-Butene, grams | 0.09 | 0.09 | 0.14 | 0.14 | 1.0 |
| millimoles | 1.6 | 1.6 | 2.5 | 2.5 | 18 |
| $Et_2AlI$, grams | 0.010 | 0.010 | 0.005 | 0.005 | 0.053 |
| millimoles | 0.05 | 0.05 | 0.025 | 0.025 | 0.25 |
| $EtAlCl_2$, grams | 0.006 | 0.006 | 0.010 | 0.010 | 0.032 |
| millimoles | 0.05 | 0.05 | 0.075 | 0.075 | 0.25 |
| $WCl_6$, grams | 0.006 | 0.006 | 0.006 | 0.006 | 0.040 |
| millimoles | 0.015 | 0.015 | 0.015 | 0.015 | 0.10 |
| $Et_2AlI/EtAlCl_2$ molar ratio | 1.0 | 1.0 | 0.3 | 0.3 | 1.0 |
| Millimoles Al compound/mole monomer | 1.2 | 1.3 | 1.2 | 1.3 | 1.1 |
| Al/W molar ratio | 6.7 | 6.7 | 6.7 | 6.7 | 5.0 |
| Time, Hours | 1.4 | 1.4 | 1.3 | 0.3 | 1.4 |
| Polymer yield, grams | 8.8 | 9.0 | 8.9 | 8.9 | 60.4 |
| Wt. % | 99 | 100 | 100 | 100 | 100 |
| Wt.% DCPD in polymer | 12 | 31 | 12 | 32 | 52 |
| IV | 2.11 | 2.43 | 1.51 | 1.57 | 1.07 |
| Appearance | Smooth | Smooth | Smooth | Smooth | Smooth |
| EXAMPLES | 16 | 17 | 18 | 19 | 20 |
| Benzene, grams | 424 | 414 | 2115 | 417 | 413 |
| moles | 5.42 | 5.30 | 27.08 | 5.34 | 5.29 |
| 5-Methyl-2-norbornene, grams | 37.0 | 15.0 | 198.6 | 37.1 | 41.3 |
| millimoles | 342 | 139 | 1836 | 343 | 382 |
| DCPD, grams | 16.5 | 40.2 | 60 | 11.9 | 12.0 |
| millimoles | 125 | 304 | 454 | 90 | 91 |
| 1-Butene, grams | 1.0 | 1.0 | 2.5 | 0.007 | 0.007 |
| millimoles | 18 | 18 | 45 | 0.1 | 0.1 |
| $Et_2AlI$, grams | 0.053 | 0.053 | 0.265 | 0.053 | 0.026 |
| millimoles | 0.25 | 0.25 | 1.25 | 0.25 | 0.125 |
| $EtAlCl_2$, grams | 0.032 | 0.032 | 0.159 | 0.016 | 0.024 |
| millimoles | 0.25 | 0.25 | 1.25 | 0.125 | 0.187 |
| $WCl_6$, grams | 0.040 | 0.030 | 0.198 | 0.020 | 0.030 |
| millimoles | 0.10 | 0.075 | 0.5 | 0.05 | 0.075 |
| $Et_2AlI/EtAlCl_2$ molar ratio | 1.0 | 1.0 | 1.0 | 2.0 | 0.7 |
| Millimoles Al compound/mole monomer | 1.1 | 1.1 | 1.1 | 0.9 | 0.6 |
| Al/W molar ratio | 5.0 | 6.7 | 2.5 | 7.5 | 4.1 |
| Time, Hours | 1.5 | 1.3 | 0.25 | 0.1 | 1.3 |
| Polymer, yield, grams | 50.6 | 39.5 | 252 | 48.3 | 52.3 |
| Wt.% | 93 | 70 | — | 99 | 98 |
| Wt.% DCPD in Polymer | 30 | 71 | 23 | 24 | 23 |
| IV | 1.68 | — | 2.50 | 4.13 | 3.89 |
| Appearance | Smooth | Smooth | Smooth | Smooth | Smooth |
| EXAMPLES | 21 | 22 | 23 | 24 | 25 |
| Benzene, grams | 416 | 402 | 410 | 413 | 420 |
| moles | 5.33 | 5.15 | 5.25 | 5.29 | 5.38 |

TABLE II-continued

| | | | | | |
|---|---|---|---|---|---|
| 5-Methyl-2-norbornene, grams | 41.3 | 41.3 | 41.4 | 41.7 | 43.3 |
| millimoles | 382 | 382 | 383 | 385 | 400 |
| DCPD, grams | 12.8 | 11.9 | 13.0 | 12.5 | 11.9 |
| millimoles | 97 | 90 | 98 | 95 | 90 |
| 1-Butene, grams | 0.007 | 0.014 | 0.133 | 0.133 | 0.178 |
| millimoles | 0.1 | 0.2 | 2.3 | 2.3 | 3.1 |
| $Et_2AlI$, grams | 0.026 | 0.026 | 0.026 | 0.026 | 0.026 |
| millimoles | 0.125 | 0.125 | 0.125 | 0.125 | 0.125 |
| $EtAlCl_2$, grams | 0.032 | 0.032 | 0.032 | 0.032 | 0.064 |
| millimoles | 0.25 | 0.25 | 0.25 | 0.25 | 0.5 |
| $WCl_6$, grams | 0.020 | 0.020 | 0.020 | 0.020 | 0.028 |
| millimoles | 0.05 | 0.05 | 0.05 | 0.05 | 0.07 |
| $Et_2AlI/EtAlCl_2$ molar ratio | 0.5 | 0.5 | 0.5 | 0.5 | 0.25 |
| Millimoles Al compound/mole monomer | 0.8 | 0.8 | 0.8 | 0.8 | 1.2 |
| Al/W molar ratio | 7.5 | 7.5 | 7.5 | 7.5 | 8.9 |
| Time, Hours | 1.0 | 0.03 | 0.5 | 0.4 | 0.8 |
| Polymer yield, grams | 51.8 | 46.9 | 47.1 | 48.8 | 41.6 |
| Wt.% | 96 | 88 | 86 | 90 | 75 |
| Wt.% DCPD in polymer | 24 | 24 | 22 | 23 | 22 |
| IV | 4.33 | 3.97 | 2.07 | 1.43 | 1.43 |
| Appearance | Smooth | Smooth | Smooth | Smooth | Smooth |

Symbols in Table II:
DCPD = Dicyclopentadiene
$Et_2AlI$ = Diethylaluminum iodide
$EtAlI_2$ = Ethylaluminum dichloride
$WCl_6$ = Tungsten hexachloride $$\text{Millimoles Al compound/mole monomer} = \frac{\text{millimoles of } (Et_2AlI + EtAlCl_2)}{\text{moles of (5-methyl-2-Norbornene + DCPD + 1-Butene)}}$$

$$\text{Al/W molar ratio} = \frac{\text{millimoles of } (Et_2AlI + EtAlCl_2)}{\text{millimoles of } WCl_6}$$

EXAMPLES 26-33

Copolymers of varying amounts of dicyclopentadiene with norbornene (Example 26) and 5-methyl-2-norbornene (Examples 27-33) were prepared following the general catalyst preparation and addition procedure of this invention as demonstrated by Example 1. The copolymers were admixed with compounding ingredients according to the recipes in Table III (all amounts are in parts by weight) and cured. Compounding was done using a two-roll mill operating at a roll temperature of about 40° C. to about 90° C.

Physical testing of the copolymers was performed, and the results are set forth in Table IV. 100% modulus, tensile strength and ultimate elongation were determined according to ASTM D412-68 using Die D dumbbells. Compression fatigue (ΔT, ° F) was tested according to ASTM D623-67 at 212° F. using a Goodrich flexometer with a 0.175 inch stroke, 55 lb. static load (143 lb/in.²), 20 minutes conditioning time and 25 minutes running time. Durometer hardness was measured according to D2240-68 using a Shore Type A durometer and a one second indentation hardness time interval. Pico abrasion resistance was measured according to ASTM D2228-69 using a 4.5 kg weight, a 60 rpm speed and 240 revolutions. Abrasion index was calculated according to 11.3 of the latter procedure.

The physical testing data indicates that the polymers tested have a good balance of physical properties that makes them suitable for tire rubber applications. The outstanding property is high tensile strength at high temperatures and is particularly important in truck tire rubbers, since truck tires run "hotter" under a heavier load than other tires.

The norbornene-dicyclopentadiene copolymers are generally plastics but are also compatible with high levels of oil (up to 400 parts by weight oil and more, more preferably 100 parts by weight oil, per 100 parts by weight polymer). The oil extended polymers may be vulcanized to produce elastomeric compositions. Vulcanized and oil-loaded norbornene-dicyclopentadiene copolymers containing increasing amounts of dicyclopentadiene have increasingly better green strength and higher tensile strength (at room temperature and 100° C.), and the compositions are suitable for use in tires, particularly in truck tires, as well as in other rubber goods. Suitable vulcanizing agents such as elemental sulfur or a thiuram di- or polysulfide and a broad range of accelerators and other compounding ingredients known to the art may be used together with the polymers produced by the process of this invention.

TABLE III

| EXAMPLES | 26 | 27 | 28 | 29 | 30 | 31 | 32 | 33 |
|---|---|---|---|---|---|---|---|---|
| Copolymer | 100 | 100 | 100 | 100 | 100 | 100 | 100 | 100 |
| Carbon Black, HAF, N330 | 95 | 95 | 70 | 130 | 112 | 110 | 110 | 85 |
| Paraffinic Oil | 75 | 75 | 40 | 125 | 100 | 100 | 100 | 62 |
| Stearic Acid | 5 | 5 | 5 | 5 | 5 | 5 | 5 | 5 |
| Zinc Oxide | 5 | 5 | 5 | 5 | 5 | 5 | 5 | 5 |
| Sulfur | 4 | 3 | 1.5 | 4 | 3.5 | 4 | 4 | 4 |
| N-cyclohexyl-2-benzothiazole sulfenamide | 4 | 3 | 1.5 | 4 | 3.5 | 4 | 4 | 4 |
| Antioxidant | 1 | 1 | 1 | 1 | 1 | 1 | 1 | 1 |

TABLE IV

| EXAMPLES | 26 | 27 | 28 | 29 | 30 | 31 | 32 | 33 |
|---|---|---|---|---|---|---|---|---|
| Wt. % Dicyclopentadiene | 0 | 22 | 22 | 23 | 24 | 32 | 53 | 53 |
| IV | 3.60 | 3.89 | 4.03 | 4.33 | 4.13 | 2.39 | 2.47 | 1.07 |
| Cure Time at 160°, minutes | 10 | 7 | 8 | 7 | 6 | 8 | 8 | 30 |
| 100% Modulus at 25° C, psig | 825 | 1000 | 1080 | 920 | 640 | 600 | 1000 | 2080 |
| 100% Modulus at 100° C, psig | 640 | 480 | 260 | 580 | 440 | 260 | 480 | 600 |

TABLE IV-continued

| EXAMPLES | 26 | 27 | 28 | 29 | 30 | 31 | 32 | 33 |
|---|---|---|---|---|---|---|---|---|
| Tensile at 25° C, psig | 3180 | 3000 | 3000 | 1920 | 2200 | 2320 | 2680 | 2800 |
| Tensile at 100° C, psig | 1360 | 1600 | 2000 | 1200 | 1200 | 1090 | 1080 | 1200 |
| % Ultimate Elongation at 25° C | 235 | 215 | 250 | 165 | 210 | 220 | 195 | 135 |
| % Ultimate Elongation at 100° C | 165 | 245 | 405 | 165 | 210 | 290 | 190 | 170 |
| Compression Fatigue (ΔT, ° F) | 72 | 61 | 59 | 42 | 58 | 55 | 51 | 50 |
| Durometer Hardness | 74 | 72 | 78 | 72 | 75 | 79 | 81 | 88 |
| Low Temperature Stiffening, $T_2$, ° C | −16 | −23 | −10 | −23 | −25 | −8 | 2 | 8 |
| Pico Abrasion Index | — | 158 | — | — | — | — | — | 85 |

I claim:

1. A ring-opening polymerized copolymer comprising polymerized units derived from (a) at least one norbornene-type monomer having the formula

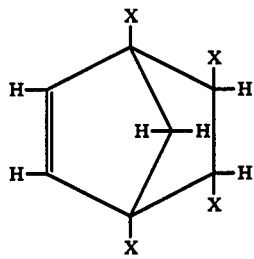

wherein any X may be hydrogen or an alkyl group containing from 1 to 20 carbon atoms, (b) dicyclopentadiene in an amount from about 40% to 95% by weight of the total weight of copolymer, and (c) from about 0.0001 to about 0.3 mole of at least one nonconjugated acyclic olefin per mole of total norbornene-type monomer and dicyclopentadiene, said acyclic olefin containing from 2 to 12 carbon atoms and having at least one hydrogen on each double-bonded carbon atom, said copolymer having repeating linkages primarily of the following types in random order, where $m$ and $n$ are numbers which are proportional to the concentrations of norbornene-type monomer and dicyclopentadiene used, and X is as defined heretofore:

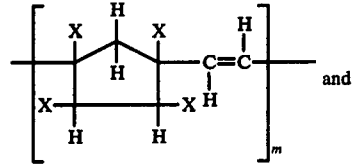 and

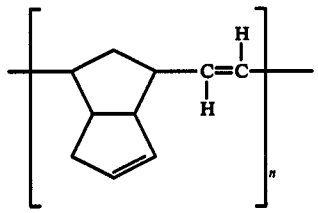

2. A copolymer of claim 1 wherein X is hydrogen or an alkyl group containing from 1 to 3 carbon atoms, and dicyclopentadiene is present in an amount from about 60% to about 95% by weight of the total weight of copolymer.

3. A copolymer of claim 2 wherein said nonconjugated acyclic olefin is a 1-olefin or 2-olefin containing from 2 to 8 carbon atoms.

4. A copolymer of claim 3 wherein said norbornene-type monomer is 2-norbornene.

5. A copolymer of claim 4 wherein said 1-olefin is 1-butene.

6. A copolymer of claim 3 wherein said norbornene-type monomer is 5-methyl-2-norbornene.

7. A copolymer of claim 6 wherein said 1-olefin is 1-butene.

8. A copolymer of claim 3 wherein said norbornene-type monomer is 5,6-dimethyl-2-norbornene.

9. A copolymer of claim 8 wherein said olefin is 1-butene.

* * * * *